US006893492B2

(12) United States Patent
White et al.

(10) Patent No.: US 6,893,492 B2
(45) Date of Patent: May 17, 2005

(54) NANOCOMPOSITES OF CELLULOSE AND CLAY

(75) Inventors: Leslie A. White, Kenner, LA (US); Christopher D. Delhom, Gretna, LA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 71 days.

(21) Appl. No.: 10/657,300

(22) Filed: Sep. 8, 2003

(65) Prior Publication Data

US 2005/0051054 A1 Mar. 10, 2005

(51) Int. Cl.$^7$ .......................... C08L 1/02; C08L 97/02; C09D 101/02; C09D 197/02
(52) U.S. Cl. .............. 106/164.51; 106/164.3; 106/200.1; 106/200.2; 106/200.3; 106/204.3
(58) Field of Search ........................ 106/164.3, 164.51, 106/200.1, 200.2, 200.3, 204.3

(56) References Cited

PUBLICATIONS

Zaikov et al, "Ecological issue of polymer flame retardancy", Journal of Applied Polymer Science, vol. 86 (10) pp. 2449–2462, Dec. 5, 2002.*
Nutt et al, "Symposium T Polymer Nanocomposites", Materials Reasearch Society, Apr. 2002.*
Ruan et al, "Structure and properties of regenerated cellulose/tourmaline nanocrystal composite films" Journal of Polymer Science Part B; Polymer Physics, vol. 42 (3), pp 367–373, Dec. 2003.*
Dougvan Wang et al., PVC–Clay Nanocomposites Preparation, Thermal and Mechanical Properties, *Polymer Preprints 2001; 42(2), 842*, no date provided.
Jisheng Ma et al., Synthesis and Characterization of Polypropylene/Clay Nanocomposites, *Journal of Applied Polymer Science*, vol. 82, 3611–3617 (2001), no date provided.
Changchun Zeng et al., Poly(methyl methacrylate) and Polystyrene/Clay Nanocomposites Prepared by in–Situ Polymerization, *Macromolecules 2001, 34, 4098–4103*, no date provided.
Hiroyuki Matsum et al., Cellulosic Nanocomposites. II. Studies by Atomic Force Microscopy, *Journal of Applied Polymer Science*, vol. 78 2254–2261 (2000), no date provided.
Kazuhisa Yano et al, Synthesis and Properties of Polyimide–Clay Hybrid, *Journal of Polymer Science: Part A: Polymer Chemistry*, vol. 31, 2493–2498 (1993), no date provided.

* cited by examiner

*Primary Examiner*—David Brunsman
(74) *Attorney, Agent, or Firm*—John D. Fado; Curtis P. Ribando; Leslie Shaw

(57) ABSTRACT

This invention relates to a process of forming a nanocomposite of cellulose with a clay material that is used as the nanofiller material. The nanocomposites show significant improvements in thermal properties when compared to unbleached cotton and cotton processed under conditions for nanocomposite preparation. The degradation temperature of these nanocomposites is significantly increased over that of unbleached cotton.

13 Claims, No Drawings

NANOCOMPOSITES OF CELLULOSE AND CLAY

FIELD OF THE INVENTION

The present invention relates to improved thermal stability of nanocomposites made from cellulosic materials in combination with clays such as smectic clays, hectorites and synthetic clays to produce materials that have a raised temperature at which degradation occurs and enhanced char yields.

DESCRIPTION OF THE PRIOR ART

The creation of nanocomposites from a combination of clays and different polymers, which are mixed when they are in the monomeric form, such as polyvinyl chloride, polypropylene, polymethyl methacrylate and polystyrene is known in the art. The prior art teaches that nylon 6-clay nanocomposites have enhanced tensile strength, an enhanced tensile modulus and a higher heat distortion temperature as compared to virgin nylon (Wang et al., Polymer Preprints 42(2), 842–843; 2001.

The creation of polypropylene/clay nanocomposites is taught by Ma et al. (Journal of Applied Polymer Science, Vol. 82, 3611–3617; 2001). With these composites the maximum decomposition temperature increased by 44° C. with the introduction of 10 wt. % clay.

Zeng et al. (Macromolecules 2001, 34, 4098–4103) discloses poly (methyl methacrylate) and polystyrene can substantially improve the dimensional stability of the polymer matrix in an exfoliated nanocomposite with uniform mesoscale clay dispersion.

Hiroyuki Matsumura and Wolfgang Glasser (Journal of Applied Polymer Science, Vol. 78, 2254–2261; 2000) have discovered that by reacting wood pulp fibers in a solvent medium that does not fully penetrate the fibers, and then hot-pressing the modified fibers at elevated temperature they were able to form a semi-transparent polymer sheet that is a nanocomposite of cellulose esters and unmodified cellulose.

Presently, no technique is available for the incorporation of clays in cellulose. A major drawback of cotton is its inherent ability to burn. Flame resistance can be imparted to cotton by conventional processes, but these finishes tend to be subject to loss after laundering and or problems with the fabric holding up to wear. There remains a need for the creation of alternate viable and cost-effective technologies to modify and make better industrial use of cotton fibers and cellulose in general which are available in abundance.

SUMMARY OF THE INVENTION

The present invention relates to the development of improved thermal stability of nanocomposites made from cellulosic materials in combination with smectic clays, hectorites or synthetic clays with a negative charge to produce materials that have increased degradation temperatures and enhanced char yields. Enhanced char yields are a significant identifier of nonflammable material. We have found that cellulose, including cotton, may be dissolved with a solvent and then intimately mixed with a clay at a molecular level. This mixing results in the creation of nanocomposites wherein the clay substituent mixes with the cellulose polymer and becomes incorporated into its matrix upon drying and removal of the solvent. The resultant nanocomposite materials may be used to produce fibers with enhanced flame retardant properties.

In accordance with this discovery, it is an object of the invention to provide a means for the creation of nanopolymers from cellulose in admixture with clays for the purpose of enhancing fire retardant properties.

Another object is to provide a means for coating materials using the created nanopolymers with enhanced properties for the purpose of fire retardance.

Other objects and advantages of the invention will become readily apparent from the ensuing description.

DETAILED DESCRIPTION OF THE INVENTION

The present invention involves the creation of enhanced thermal stability properties for cellulosic materials such as fibers from bast e.g. flax, kozo and kenaf; wood fibers, leaf fibers e.g. sisal, henequen and abaca; and grass fibers (bamboo and rice straw, bagasse; cotton fiber) and previously processed cellulose fibers such as paper, newspaper or cardboard.

The invention relates to the creation of cellulose-based materials having an increased range of temperatures they will tolerate before undergoing degradation, and the ability of these materials to create high levels of char yield, which is used as a factor to determine level of flammability, as compared to untreated material.

It has been found that cellulosic materials treated with clays such as smectic clays, hectorites and synthetic clays produce materials that have increased degradation temperatures and enhanced char yields. The synthetic clays should have a negative surface charge and be regarded as hydrophobic colloids. Examples of usable synthetic clays are laponite, cloisite, flurohectorite, hydrotalcite and hematite. Preferred clays are clays of the smectic class. Types of smectic clays include aliettite, beidellite, hectorite, montmorillonite, nontronite, saponite, sauconite, stevensite, swinefordite, volkonskoite, yakhontovite, and zincsilite. The nanocomposites produced contain clay at a level of 0.5%–25% of the cellulose/clay composition, with a preferred range being 5%–15% and a most preferred range of 7%–10%.

We have found that cellulose, including cotton, may be totally or partially dissolved with a solvent and then have a clay, such as a smectic clay, hectorite or a synthetic clay mixed with it. Partial dissolution is defined as being a minimum of 50% by weight of the cellulose dissolved. This mixing results in the creation of nanocomposites wherein the clay substituent mixes with the cellulose polymer and becomes incorporated into its matrix upon drying and removal of the solvent. This forms the basis of creating fibers with enhanced flame retardant properties.

Combination Parameters

The clay is required to be pretreated with an ammonium salt or acid that possesses alkylammonium cations or arylammonium cations such as first, second, third degree salts and quaternary compounds preferred compounds include dodecylamine, 12-aminododecanoic acid, or n-decyltrimethyl ammonium chloride alkyl ammonium salts. The resultant pretreated clay is suspended in water. Appropriate concentrations of the alkyl or aryl ammonium cations in water range from 0.005 M to 0.2 M for treating from 1 to 15 grams of clay. This pretreated clay suspension is then dried. The dried clay and the cellulosic material are then combined (with the order of combination not being critical) with a polar aprotic solvent such as 4-methylmorpholine-N-oxide (MMNO), cupriethylenediamine hydroxide, saturated zinc chloride, calcium thiocyanate and lithium chloride/dimethyl acetamide with the concentration of the solvent used being dependent upon the amount of cellulosic material to be dissolved. By way of example, for cotton cellulose a ratio of about 50 ml of MMNO per gram of cotton cellulose is preferred, while, for other cellulosics and alternate solvent systems the ratio may range from about 10 ml to about 500 ml per gram of material. The amount of clay combined with the cellulosic material should be sufficient to provide a dried cellulose/clay nanocomposite having between 0.5%–25% clay by weight, preferably between 5%–15, and most preferably between 7%–10%.

This cellulose/clay/solvent mixture typically is then heated and refluxed at a temperature ranging from about 100° C. to 150° C. until a suitable amount of the cellulose material is dissolved and the clay is suspended. Approximately 1 hour to 3 hours after reflux is initiated the cellulosic material should be dissolved. If less than total dissolution of the cellulose is necessary then the amount of time involved in this step can be reduced accordingly. Cellulosic fibers from cotton take the greatest amount of time to dissolve due to the nature of its highly crystalline structure and its inherently high molecular weight. Cellulosic material from sources other than cotton fiber will dissolve more readily because of their lacking either or both of these properties. The resultant viscous amber solution is then removed from heat and precipitated in acetonitrile or any other polar solvent that is miscible with the solvent system utilized. The cellulose/clay nanocomposite precipitate may then be dried and collected. The material is preferably filtered and washed in water. The determination of filter and wash parameters are within the skill of the ordinary artisan.

The material is preferably washed and filtered 1 to 5 times, preferably 2–3 times. The cellulosic material is collected and dried under conditions that will not degrade the material so as to make it unusable. Temperatures up to the degradation temperature of cellulose are usable, but temperatures under 175° C. are preferred.

The process of the invention does not require that the clay and the cellulose be added to the solvent solution in a particular sequence. Thus, the order of combination described above can be reversed or carried out simultaneously by whatever means is available to the skilled artisan.

EXAMPLE 1

Cotton nanocomposites containing 0%–15% montmorillonite clay as filler material were prepared in batches of 1–2 grams of material according to the following procedures. Montmorrillonite K10 clay (Aldrich Chemical Company, Milwaukee, Wis.) was pretreated with the ammonium salt of dodecylamine according to a previously published procedure (K. Yano, A. Usuki, A. Okada, T. Kurauchi, O. Kamigaito; Journal Polymer Science, Part A: Polymeric Chemistry, 31, 2493, 1993). The pretreated clay was then used in the following procedure. Pretreated montmorilonite clay was stirred rapidly in MMNO. After 30 minutes of stirring, cotton was added to the flask. The cotton/clay/MMNO solution was heated to reflux with continued stirring. Approximately 1 hour after reaching reflux, the cotton dissolved.

The viscous amber colored solution was removed from heat and reprecipitated into acetonitrile. The material was filtered and washed a second time in acetonitrile. After filtration, the material was washed in deionized water. After the final wash and filtration, the samples were collected as a powder and dried under vacuum at 120° C.

Thermogravimetric analyses (TGA) were performed on a TA Instruments Hi-Res TGA 2950. Samples were heated to 120° C. and held isothermally for 1 hour to normalize for moisture content. After air-cooling, scans were run from 40° C. to 600° C. at a heating of 10° C./min. Differential scanning calorimetry (DSC) was performed on a Mettler Toledo DSC 821. Thermal analysis results are shown in Table 1.

TABLE 1

| Sample (wt % clay) | $T_{dec}$ (° C.) | Char yield (%) |
|---|---|---|
| 0 | 326 | 3 |
| 1 | 327 | 8 |
| 2 | 331 | 12 |
| 3 | 327 | 13 |
| 7 | 327 | 28 |
| 10 | 321 | 30 |
| 15 | 316 | 34 |

EXAMPLE 2

Following the protocols of Example 1, nanocomposite formulations were prepared using kenaf, ramie; and wood pulp as the source of cellulose. Pretreated montmorillonite clay or cloisite clay (a natural montmorillonite modified with a quarternary ammonium salt) (Southern Clay Products, Inc., Gonzales, Tex.) was used as the filler material. The cellulosic fibers were soaked in MMNO prior to heating to allow wetting of the fiber by the solvent. Thermal analysis results are presented in Table 2.

TABLE 2

|  |  | $T_{dec}$ (° C.) | Char yield (%) |
|---|---|---|---|
| Cotton | control | 282 | 3 |
|  | montmorillonite | 327 | 28 |
|  | cloisite | 311 | 23 |
| Ramie | control | 290 | 16 |
|  | montmorillonite | 335 | 32 |
|  | cloisite | 313 | 27 |
| Kenaf | control | 283 | 12 |
|  | montmorillonite | 321 | 25 |
|  | cloisite | 305 | 22 |
| Wood | control | 284 | 13 |
|  | montmorillonite | 313 | 25 |
|  | cloisite | 300 | 21 |

EXAMPLE 3

A nanocomposite formulation of 93% cotton and 7% montmorillonite clay was prepared. The mixture was stirred in an open container with heat until cellulose dissolution occurred. Using an automated syringe pump (Pump model 210, KD Scientific, New Hope, Pa.) the viscous dope was extruded from syringes through an 18½ gauge needle at pump speeds varying from 1 mL/min to 10 mL/min. The fibers were spun into an open bath of either acetonitrile or water.

The coagulated fibers were collected manually and washed with water. Both solvents resulted in the removal of MMNO to allow coagulation of the regenerated cellulose and produced nanocomposites in the form of fibers or films. These resultant fibers and films were then dried. The materials were then tested for thermal properties. Thermal decomposition temperature for the materials was 333° C. and the char yield was 25%. These results are comparable to those obtained from cotton nanocomposites of similar formulation produced in Examples 1 and 2.

It is understood that the foregoing detailed description is given merely by way of illustration and that modifications and variations may be made therein without departing from the spirit and scope of the invention. For example, choice of specific components, their relative proportion and degree of reaction may be readily determined by those skilled in the art without undue experimentation using the teachings hereof.

We claim:

1. A composition comprising a cellulose/clay nanocomposite wherein the clay component represents 0.5% to 25% by weight of the nanocomposite.

2. The composition of claim 1 wherein the cellulose is selected from the group consisting of bast fibers, wood fibers, leaf fibers, grass fibers, bagasse, cotton fiber, paper, newspaper and cardboard.

3. The composition of claim 1 wherein the clay is selected from the group consisting of smectic clays, hectorites and synthetic clays.

4. The composition of claim 3 wherein the clay is a smectic clay.

5. The composition of claim 4 wherein the clay is montmorillonite.

6. The composition of claim 1 wherein the clay component represents 5% to 15% by weight of the nanocomposite.

7. The composition of claim 1 wherein the clay component represents 7% to 10% by weight of the nanocomposite.

8. A method of producing a cellulose/clay nanocomposite comprising the steps of:
   a) providing a clay selected from the group consisting of smectic clays, hectorites and synthetic clays, pretreating the clay with an alkylammonium or an arylammonium cation, and suspending the pretreated clay in water to form a suspension;
   b) drying the suspension of step a) to form a dried clay;
   c) mixing the dried clay from step b) and a cellulosic material in a cellulose solvent and heating and refluxing the admixture at a temperature ranging from about 100° C. to 150° C. for a period of time sufficient to suspend the clay and partially or completely dissolve the cellulose;
   d) precipitating the product of step c) in a polar solvent that is miscible with said cellulose to form of a cellulose/clay composite; and
   e) collecting and drying the reprecipitated cellulosic/clay material.

9. The method of claim 8 wherein the clay is a smectic clay.

10. The method of claim 9 wherein the smectic clay is montmorillonite.

11. The method of claim 8 wherein the clay is pretreated with an ammonium salt selected from the group consisting of dodecylamine, 12-aminododecanoic acid and n-decyltrimethyl ammonium chloride alkyl ammonium salts.

12. The method of claim 8 wherein the cellulosic material is selected from the group consisting of bast fibers, wood fibers, leaf fibers, grass fibers, bagasse, cotton fiber, paper, newspaper and cardboard.

13. The method of claim 12 wherein the cellulosic fiber is either wood fibers cotton fibers.

* * * * *